Aug. 28, 1962　　　P. L. PORTER　　　3,051,274
HYDRAULIC LOCKING DEVICE
Filed March 10, 1959　　　　　　　　　　　4 Sheets-Sheet 1
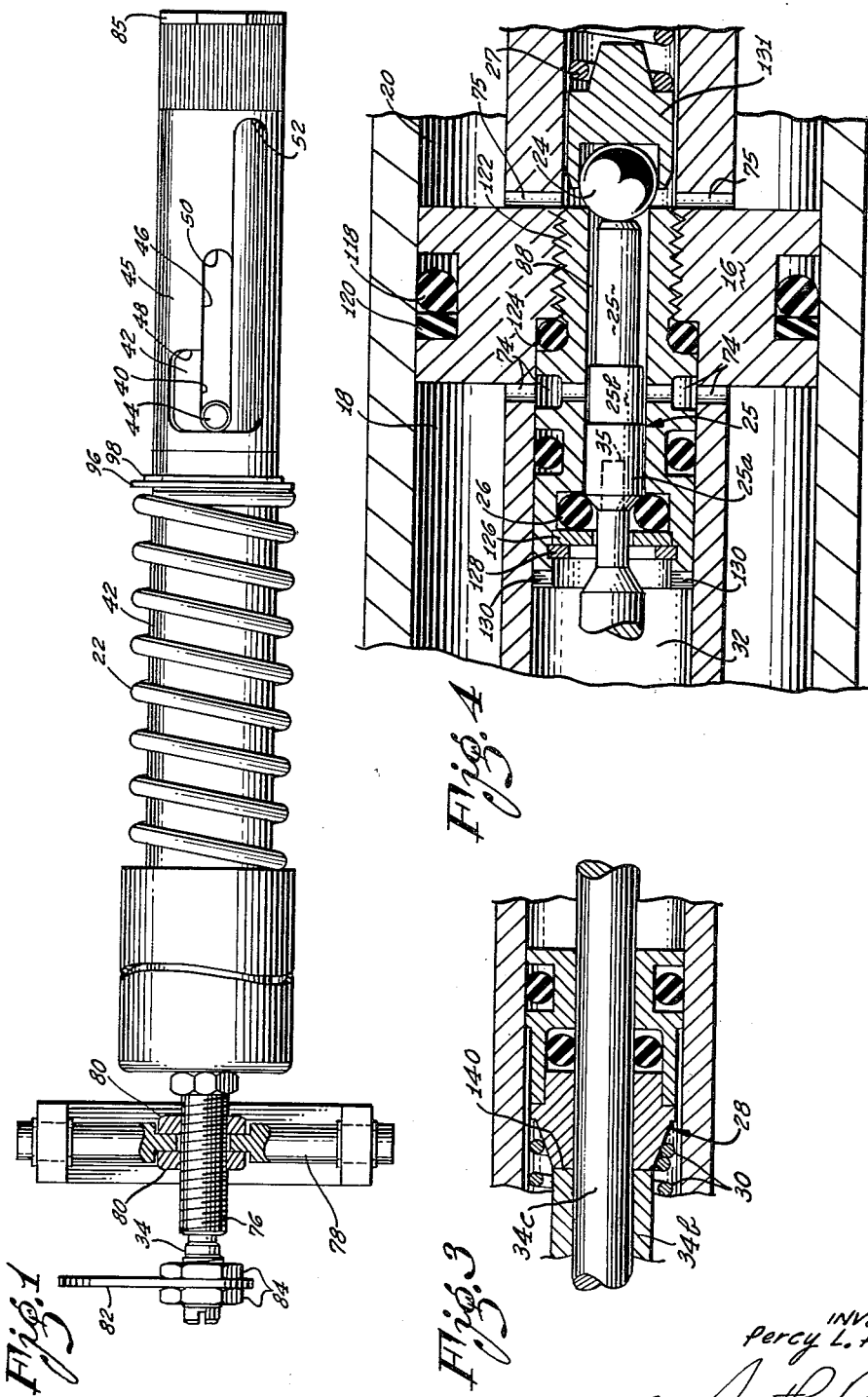
INVENTOR
Percy L. Porter
Attorneys

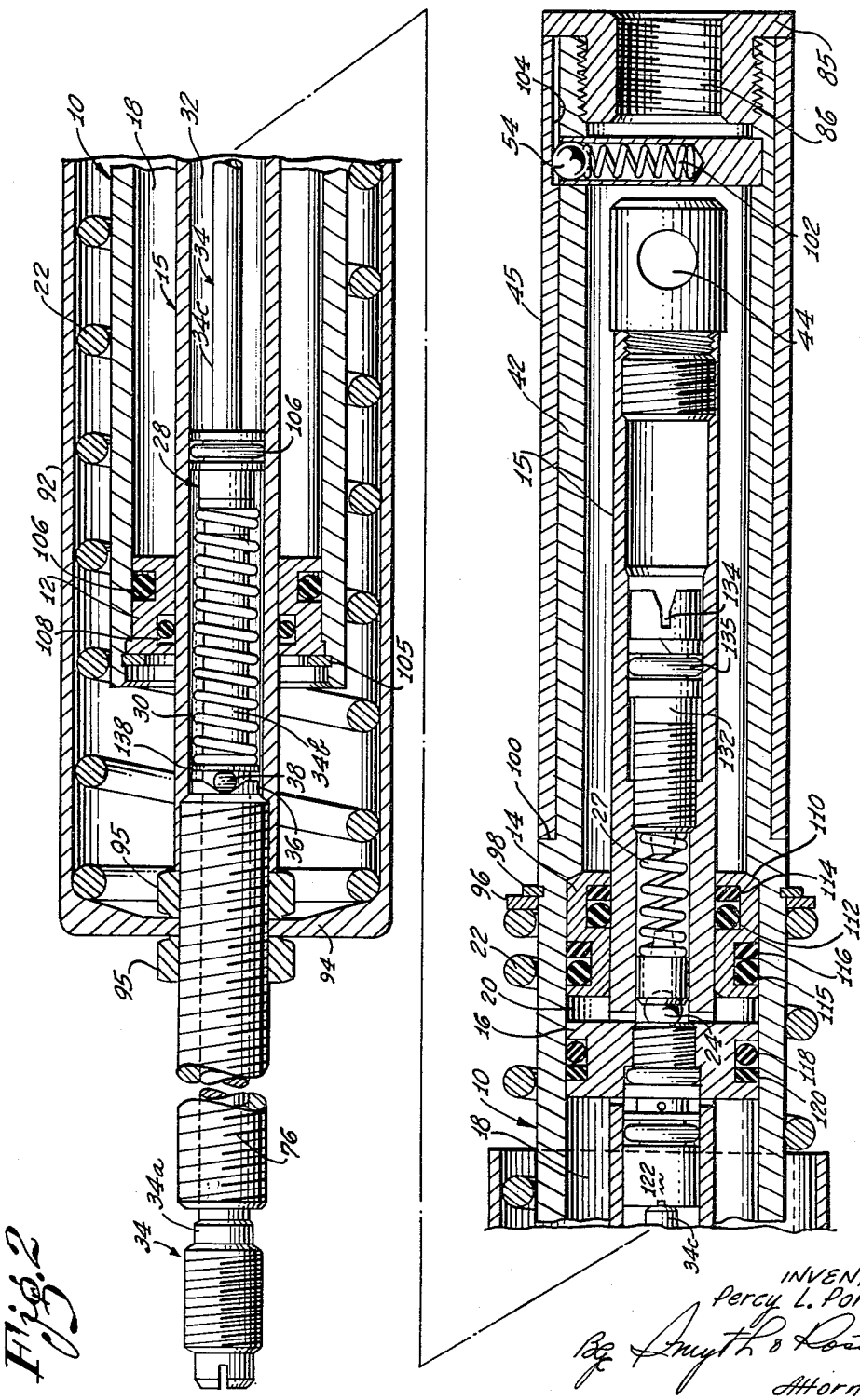

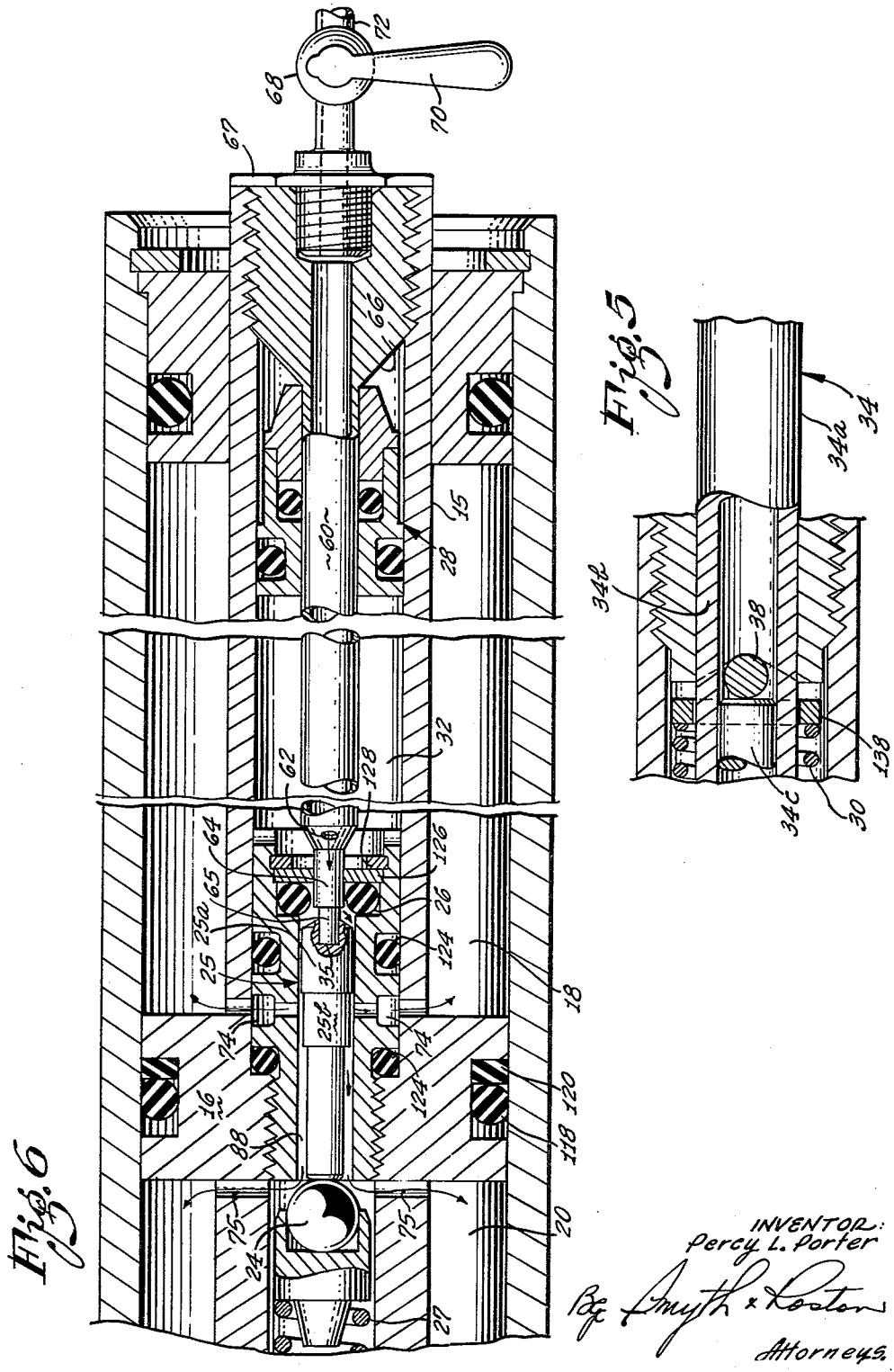

Aug. 28, 1962  P. L. PORTER  3,051,274
HYDRAULIC LOCKING DEVICE
Filed March 10, 1959  4 Sheets-Sheet 4
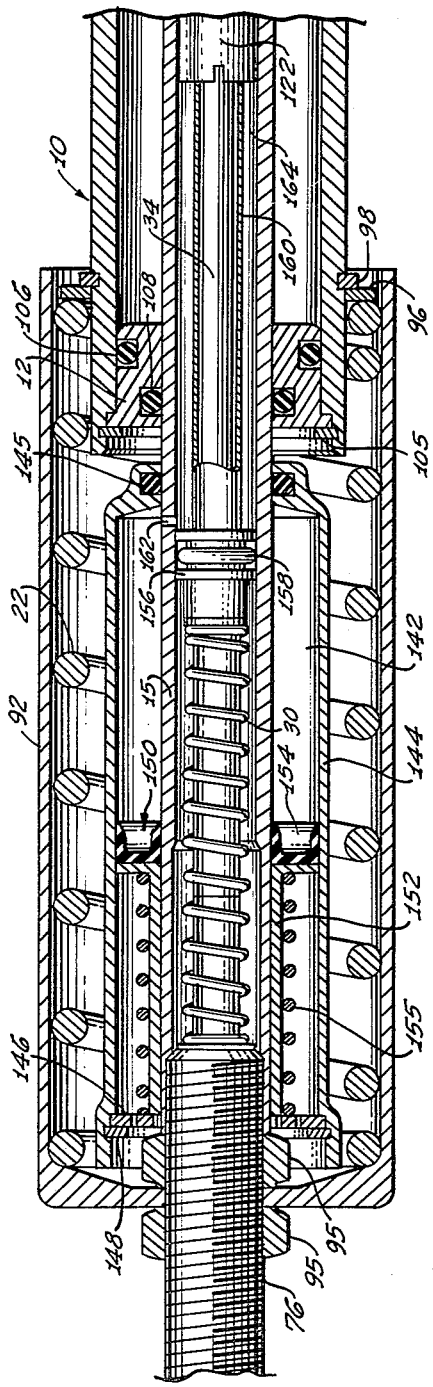
Fig. 7
INVENTOR.
Percy L. Porter
Attorneys 3,051,274
HYDRAULIC LOCKING DEVICE
Percy L. Porter, Los Angeles, Calif., assignor to
P. L. Porter Co., Los Angeles, Calif.
Filed Mar. 10, 1959, Ser. No. 798,436
12 Claims. (Cl. 188—96)

This invention relates to a longitudinally extensible and contractable hydraulic locking device to control the spacing between two members. While the invention is widely applicable for its purpose, it has special utility for controlling the tiltable back rest of a reclining seat for use in aircraft and other vehicles. Such an embodiment of the invention has been selected for the present disclosure and will provide adequate guidance for those skilled in the art who may have occasion to apply the same principles to other specific purposes.

A device of this type is disclosed in the Porter et al. Patent 2,559,047, issued July 3, 1951, and the application of such a device to the control of a tiltable back rest of a reclining chair is set forth in the Armstrong Patent 2,522,246, issued September 12, 1950. These two prior disclosures are hereby incorporated into the present disclosure by reference.

A hydraulic locking device of this type comprises a cylinder confining a quantity of hydraulic fluid and a piston dividing the cylinder into two hydraulic locking chambers, the piston being unitary with a tubular piston rod which extends through both ends of the cylinder. What may be termed a locking valve controls communication between the two locking chambers and is normally closed to immobilize the piston. A heavy external coil spring functions in compression between the cylinder and the piston rod to oppose contraction of the hydraulic locking device, i.e., to oppose the backward tilt of the back rest of the seat. Thus the heavy spring serves to counterbalance and to erect the back rest.

Space inside the tubular piston rod is utilized as a reservoir in communication with one of the two hydraulic chambers to hold a reserve supply of the hydraulic fluid. This reservoir is adapted to expand and contract to accommodate thermal expansion and contraction of the structure and of the fluid in the two locking chambers.

The purpose of the present invention is to meet certain problems and difficulties that have become increasingly troublesome with the rapid progress of the art. Some of these problems and difficulties arise from the fact that the back rests of reclining seats for aircraft use are designed to tilt backward to a greater extent than ever before with consequent increase in the weight that must be counterbalanced by the heavy external coil spring. It has become necessary, therefore, to use heavier counterbalancing springs with corresponding great increase in the normal pressure which is maintained in the cylinder by the pressure of the spring.

The normal spring pressure in the earlier hydraulic seat locks for aircraft use was substantially under 75 pounds and the pressure was later increased to 75 pounds. More recently, with seat back rests designed to recline back to angles of approximately 68°, it has been necessary to increase the spring pressure to 130 pounds and probably a further increase in spring pressure will follow. In a hydraulic locking device of the present construction, a normal spring pressure of 130 pounds results in a normal static fluid pressure of 350 p.s.i. in one of the two locking chambers.

A serious difficulty to which the invention is directed is that the gland that forms one end of the fluid reservoir is subject to excessive wear that makes replacement necessary after only a relatively short service period. In this regard, the invention is based on the discovery of the reason for this defect. It has been found that with the normal static fluid pressure increased to the new high level and with the fluid reservoir in continuous communication with the high pressure chamber and normally maintained at the same pressure, the gland cycles, i.e., reciprocates every time the device is operated for a change in the position of the tiltable back rest. This repeated cycling under high pressure causes the O-ring of the gland to wear with consequent development of leakage which eventually makes the device inoperative.

Based on this discovery of the defect in the operation of hydraulic locking devices of the present type as heretofore constructed, the invention provides a positive check valve to control communication between the hydraulic reservoir and the two locking chambers and the invention interconnects the check valve and the locking valve in such manner that the check valve may be regarded as responsive to operation of the locking valve or, conversely, the locking valve may be regarded as responsive to the operation of the check valve.

This simple provision has the important advantage of normally cutting off the reservoir from the high pressure locking chamber. Communication between the reservoir and the locking chamber is established only during the adjustment periods with the hydraulic fluid actively flowing between the two chambers at a relatively low static pressure. As a result of this arrangement, the normal static pressure in the reservoir is substantially below the normal pressure in the locking chamber that is dominated by the counterbalancing spring.

A further feature of the invention for avoiding destructive excessive cycling of the reservoir gland is the concept of arranging for the check valve to be non-responsive to slight opening movement of the locking valve, the check valve opening only when the locking valve is open to a substantial extent. It has been found that in most instances the seat occupant actuates the locking valve only lightly to make an adjustment of the tiltable back rest, but the locking valve is operated more violently in a minor percentage of instances with consequent accompanying opening of the check valve to permit flow into or out of the reservoir to compensate for thermal changes and to replenish the fluid in the two locking chambers. A minor percentage of occupants of aircraft seats may be depended upon to apply a substantial magnitude of force to open the locking valve and when the hydraulic locking device is first operated when an airplane is first placed in service in cold weather, the sluggishness of the hydraulic fluid usually causes the first person that operates the device to open the locking valve fully.

By making the check valve of the fluid reservoir responsive only to relatively forceful opening of the locking valve, the invention decreases the frequency of the operation of the check valve far below the frequency of operation of the locking valve. Thus the invention extends the life of the gland of the fluid reservoir both by reducing the normal pressure in the fluid reservoir and by greatly reducing the frequency with which the fluid reservoir is placed in communication with the two locking chambers.

A certain problem arises in that dynamic fluid pressure of high magnitude, as distinguished from static fluid pressure, is created by the flow between the two locking chambers in the operation of adjusting the tilt of the back rest. If the high dynamic pressure were to be communicated to the fluid reservoir, the purpose of the invention would be defeated. This problem is made difficult by the fact that there must be freedom for fluid flow between the check valve and the two locking chambers and, in the initial assembly of the device, the two locking chambers must be filled through the check valve.

The invention solves this problem by providing a restricted annular fluid passage between the check valve and the two locking chambers. The annular fluid passage is ample for normal operating communication between the reservoir and the two locking chambers and is ample for the filling operation but, nevertheless, is sufficiently extensive in length and restricted in cross-section to prevent any substantial transmission of the dynamic pressure to the check valve.

Another problem that arises in the more recent developments in this art is the shortening of the range or "stroke" of the hydraulic device. Operating strokes are often less than one and one-fourth inches and in at least one instance the operating stroke has been reduced to less than one inch. In contrast, operating strokes of more than three inches were usual only a few years ago. The shortening of the operating stroke makes dimensioning and functioning of the device more critical.

In this regard, a further feature of the invention is a construction for the hydraulic locking device which makes it possible in the procedure of assembling the device to pre-load the two locking chambers and the check valve with fluid pressure exceeding the normal operating pressure. This initial filling of the device with highly pressurized fluid takes up slack largely by fully compressing the packings and seals associated with the piston, the piston rod and the check valve. As will be explained, the invention carries out this purpose by providing operating means for the check valve and locking valve, which operating means is replaced by a special hydraulic filling nozzle at an advanced point in the assembly of the device.

A still further problem to which the invention is directed arises from the fact that the seats in an airplane are mounted on a longitudinal track which makes it possible to remove seats and add seats at will for various types of service. For so-called "high density" seating, the seats are placed close together, for example for daytime coach service. The seats are more widely spaced for first-class daytime service to permit the back rests to be tilted backward to substantial angles. Still fewer seats at greater spacing are employed for night flying to permit the back rests to be tilted to the maximum angles. The problem is to provide seats which may be used interchangeably for these various kinds of services without the possibility of a back rest being titled by an occupant to a greater angle than permitted by the spacing of the seats, with consequent hazard to the occupant of the next rearward seat.

The invention meets this last problem by providing for adjustability of the maximum length of the stroke of the hydraulic locking device. The maximum length is selected for maximum spacing of the seats, an intermediate length is used for intermediate spacing of the seats, and a third shorter length adjustment is available for use when the seats are at minimum spacing. This feature makes the seat highly flexible in the sense that it may be readily adapted to the various kinds of service.

The features and advantages of the invention may be understood from the following detailed description taken with the accompanying drawings.

In the drawings, which are to be regarded as merely illustrative:

FIG. 1 is a side elevation of the presently preferred embodiment of the invention;

FIG. 2 is an enlarged longitudinal sectional view of the same embodiment of the invention;

FIG. 3 is an enlarged fragmentary longitudinal sectional view showing the construction of the gland of the fluid reservoir;

FIG. 4 is a similarly enlarged fragmentary longitudinal sectional view of the piston assembly including the locking valve and the check valve;

FIG. 5 is an enlarged fragmentary longitudinal sectional view of the cam arrangement for converting rotation of the valve operating rod into longitudinal movement of the rod;

FIG. 6 is an enlarged fragmentary longitudinal sectional view showing how a specialized nozzle may be substituted for the valve operating rod at an advanced stage in the assembly of the device for the purpose of introducing fluid at high pressure through the check valve into the two locking chambers; and FIG. 7 is a fragmentary longitudinal sectional view showing a modification for providing a relatively large fluid reservoir chamber.

*General Arrangement*

The principal parts of the embodiment of the invention shown in FIGS. 1 to 5 include: a cylinder 10 with two end walls 12 and 14; a tubular piston rod 15 extending through the two end walls; a piston 16 united with the piston rod and dividing the interior of the cylinder between the two end walls into two locking chambers 18 and 20; a heavy external counterbalancing coil spring 22 in compression between the cylinder and the piston rod to exert counterbalancing force; a locking valve in the form of a ball member 24 seating in the piston 16 to control fluid flow between the two locking chambers through the piston; a check valve inside the tubular piston rod in the form of a solid cylindrical valve member, generally designated 25 (FIG. 4) with a tapered shoulder for normal pressure contact with a seat in the form of an O-ring 26, this cylindrical valve body extending to the locking valve ball 24 for actuation thereof; a coil spring 27 acting under compression normally to hold both the locking valve ball member 24 and the check valve member 25 in their closed positions; a tubular gland, generally designated 28, under the pressure of a coil spring 30 to serve as one end wall of an annular fluid reservoir chamber 32, the second end wall of the chamber being provided by the check valve; an operating rod or push rod 34 extending from the exterior of the device through the gland 28 and through the O-ring 26 into a socket 35 (FIG. 4) of the check valve member 25 to shift the check valve member towards its open position and thereby unseat the locking valve ball member 24; cam means 36 cooperating with a follower in the form of a diametrical pin 38 to convert rotation of the operating rod 34 into longitudinal shift thereof to operate the two valves; means to prevent relative rotation between the cylinder 10 and the piston rod 15 comprising a pair of diametrically opposite longitudinal slots 40 (FIG. 1) in an extension 42 of the cylinder and a diametrical pin 44 that is carried by the piston rod in sliding engagement with the two slots; an adjustable stop sleeve 45 (FIG. 1) that is rotatably mounted on the cylinder extension 42 and has a pair of diametrically opposite slots 46 of stepped configuration providing corresponding pairs of stop shoulders 48, 50 and 52 to cooperate selectively with the diametrical pin 44; and detent means 54 (FIG. 2) to releasably hold the stop sleeve 45 selectively at three positions for cooperation of the stop shoulders 48, 50 and 52, respectively, with the diametrical pin 44.

*Operation*

FIG. 6 shows a special nozzle 60 that is used to charge the device with pressurized hydraulic fluid at an advanced point in the assembly procedure. The nozzle 60 is of tubular construction with a discharge port 62 and a nose 64 having an end portion 65 of reduced diameter to fit into the socket 35 of the check valve member 26. The body of the nozzle 60 has an enlargement 66 which threads into the tubular piston rod 15 and a flange 67 to abut the end of the piston rod to stabilize the nozzle. Secured to the nozzle by screw threads is a supply valve 68 controlled by a handle 70 and this valve is connected by a passage means 72 with a source of hydraulic fluid under relatively high pressure. The pressure in this instance is preferably on the order of 500 to 600 p.s.i.

With the nozzle 60 extending through the tubular gland 28 and with the end portion 65 of the nose of the nozzle extending into the socket 35 of the check valve member 26, the nozzle holds both the check valve member and the locking valve ball 24 in their open positions in opposition to the coil spring 27. When the handle 70 is turned to open the supply valve 68, the highly pressurized hydraulic fluid flows through the nozzle 60 and out of the nozzle port 62 into the interior of the fluid reservoir 32 and causes the gland 28 to back up against the enlargement 66 of the nozzle.

The highly pressurized hydraulic fluid then flows through the open check valve through radial ports 74 into the locking chamber 18 and through radial ports 75 into the locking chamber 20. When the flow ceases, the supply valve 68 is closed and the nozzle 60 is withdrawn. The resultant drop in pressure in the fluid reservoir 32 causes the check valve 26 to be closed by the fluid pressure in the locking chambers 18 and 20, the locking valve closing at the same time. The assembly of the device may then be completed with the high magnitude pressure in the two locking chambers 18 and 20 maintained by the closed check valve.

FIG. 1 shows how a threaded extension 76 of the tubular piston rod 15 may be secured to a fixed member 78 of the seat structure by means of a pair of cooperating nuts 80. FIG. 1 also shows how the outer end of the operating rod 34 carries an operating arm 82 that is secured thereto by a pair of cooperating nuts 84. As best shown in FIG. 2, the opposite end of the device which is the outer end of the cylinder extension 42 is provided with a bushing 85 having an internal screw thread 86 by means of which it may be operatively connected to the back rest of a seat (not shown). The connection is below the pivot axis of the back rest so that the hydraulic locking device is contracted by any backward tilt movement of the back rest, the relative position of the piston 16 being moved rightward as viewed in the drawings to contract the rightward locking chamber 20 in opposition to the resistance of the external counterbalancing spring 22.

To cause the locking valve ball 24 to be unseated for changing the adjustment of the seat back rest, the operating arm 82 of the operating rod 34 is actuated by suitable manual means which usually includes a push button (not shown) for the convenience of the occupant of the seat. The rotation of the operating rod 34 causes the follower or diametric pin 38 to climb the inclined cammed surfaces of the cam means 36 with consequent axial shift of the operating rod towards the right as viewed in the drawings. The rightward shift of the operating rod 34 correspondingly shifts the check valve member 25 to the right to unseat the locking valve ball 24 in opposition to the coil spring 27.

As heretofore stated, in most instances the operating arm 82 is swung sufficiently merely to "crack" the locking valve, i.e., to barely unseat the locking valve ball member 24. Such a relatively slight longitudinal shift of the check valve member 25 merely reduces the pressure of the check valve member against the O-ring seat 26 without actually opening the check valve. In most instances, therefore, the locking valve ball member 24 is unseated sufficiently to permit fluid flow between the two locking chambers 18 and 20 without corresponding opening of the check valve. In other fewer instances, however, the operating arm 87 is swung through a wider arc to cause greater axial shift of the operating rod 34 to cause the check valve as well as the locking valve to open.

When the locking valve ball member 24 is unseated, fluid may pass in either direction between the locking chambers 18 and 20 through the previously mentioned radial ports 74, the annular passage 88 around the check valve member 25 and the previously mentioned radial ports 75. It is to be noted that the check valve member 25 has a longitudinally extensive enlarged portion 25a immediately adjacent the O-ring 26 and has a second enlargement 25b of slightly lesser diameter adjacent the enlargement 25a and directly opposite the radial ports 74. The first enlargement 25a fits into the surrounding structure with restricted clearance, the clearance being adequate, however, for flow between the fluid reservoir chamber 32 and the two locking chambers but sufficiently restricted to prevent any substantial transmission of dynamic pressure into the fluid reservoir 32 when the check valve is open.

It is apparent that by virtue of this arrangement, the check valve member 25 is unseated much less frequently than the locking valve ball 24 and, therefore, exposes the interior of the fluid reservoir chamber only infrequently to the pressure of the active locking fluid. Whenever the check valve is opened, it is cut off from the dynamic pressure by the restricting enlarged portion 25a. Consequently, the pressure in the fluid reservoir 32 is relatively low. For example, with the external counterbalancing spring 22 exerting a normal thrust of 130 pounds to maintain the leftward locking chamber 18 under a normal fluid pressure of approximately 350 p.s.i., the pressure in the fluid reservoir 32 is maintained at approximately 100 p.s.i. when containing a maximum quantity of reserve fluid with the reservoir spring 27 under maximum contraction. The pressure in the fluid reservoir drops to approximately 40 p.s.i. when the reservoir spring 27 is extended with the reservoir nearly empty after a long service period.

The function of the second lesser enlargement 25b of the check valve member 25 is to provide what may be termed secondary metering to control the rate at which fluid flows through the piston between the two locking chambers when the locking valve ball 24 is in its open position. This clearance is very critical for a short stroke. It has also been found that the restriction must be localized or of relatively short axial dimension because otherwise the restriction would create back pressure which would cause the reservoir gland 28 to cycle on those occasions when the check valve opens.

The check valve opens whenever replenishment of the fluid in the two locking chambers is required and whenever flow between the reservoir and the two chambers is required to compensate for thermal changes. These occasions on which the check valve opens are infrequent, but it has been found that such infrequency is not disadvantageous. One reason why such infrequent opening of the check valve may be tolerated is that the check valve itself is resilient since the check valve member 25 is free to exert various degrees of pressure against the O-ring valve seat 26. With the pressure in the fluid reservoir 32 at a relatively low magnitude and with the fluid reservoir communicating with the two locking chambers only infrequently, and never when the locking valve is closed, the spring pressed gland 28 is not frequently cycled. Consequently, the gland is subject to but little wear and stands up to maintain the operating efficiency of the device over a long service period without any attention or servicing whatsoever.

On occasion an occupant of the seat "over-rides" the normally closed locking valve 24 by pulling the inclined back rest of the seat forcibly forward without taking the trouble of manually unseating the locking valve ball member 24. The consequent steep rise in fluid pressure in the locking chamber 20 causes the locking valve ball 24 to retract in opposition to the coil spring 27 to permit the hydraulic fluid to flow from the locking chamber 20 through the piston 16 into the locking chamber 18. At such times, the pressure in the locking chamber 18 is boosted to peak values above the normal fluid pressure created by the external counterbalancing spring 22 and in the absence of the check valve of the present invention, these peak pressures would be transmitted to the interior of the fluid reservoir 32. In the present device, however, the check valve member 25 remains closed and merely closes tighter in response to the pressure peaks to keep the fluid reservoir 32 effectively isolated from the peak pressures.

If the seat is to be used for day time plane service, first-class, where the spacing of the seats is intermediate the restricted spacing for "coach" service and the more extensive spacing for night flying, the adjustable stop sleeve 45 is manually rotated to the position shown in FIG. 1 to place the diametrically opposite stop shoulders 50 in alignment with the guide slots 40 of the cylinder extension 42. The stop shoulders 50 limit the range of movement of the diametric pin 44 and thereby limit the extent to which the hydraulic locking device may be contracted for the backward tilt of the seat rest. As shown in FIG. 1, the locking sleeve 45 has a knurled or serrated portion 90 to facilitate this adjustment. In like manner, the stop sleeve 45 may be rotated to place the pair of diametrically opposite stop shoulders 48 in the path of the diametrical pin 44 if the seat is to be used for coach service where lesser spacing is provided between the seats; or the locking sleeve may be rotated to the opposite extreme to place the pair of diametrically opposite shoulders 52 in the path of the diametrical pin 44 when the seat is to be used for night time flight with maximum spacing between the successive seats.

Structural Details

In a well-known manner, a cylindrical guard 92 having an integral end wall 94 is fixedly mounted on the threaded extension 76 of the piston rod 15 by a pair of cooperating nuts 95 as best shown in FIG. 2. This guard encloses and seats one end of the external counterbalancing spring 22, as shown in FIGS. 1 and 2, and the second end of the spring presses against a ring 96 which backs against a snap ring 98. The extension 42 of the cylinder 10 is reduced in diameter to form a shoulder 100 for abutment by the inner end of the stop sleeve 45, the outer end of the stop sleeve abutting the previously mentioned bushing 85.

The previously described detent means 54 (FIG. 2) is in the form of a steel ball under radial pressure by a spring 102. The inner circumference of the stop sleeve 45 has a series of three longitudinal grooves 104 for selective engagement by the detent ball, the positions of the longitudinal grooves corresponding to the effective positions of the stop shoulders 48, 50 and 52.

The end wall 12 of the cylinder 10 is in the form of a gland backed against a snap ring 105, the gland carrying an outer O-ring 106 for sealing engagement with the surrounding cylinder and an inner O-ring 108 for sealing engagement with the piston rod 15. In like manner, the second end wall 14 of the cylinder is in the form of a gland that backs against an internal circumferential shoulder 110. The gland is provided with an outer O-ring 112 and an associated backup ring 114 and an inner O-ring 115 with an associated backup ring 116.

The piston 16 which is integral with the tubular piston rod 15 carries an outer O-ring 118 and an associated backup ring 120 to form a seal between the piston ring and the surrounding cylinder 10. As best shown in FIG. 4, a valve body 122 extending axially through the piston in threaded engagement therewith forms a seat for the locking valve ball member 24. The valve body is sealed with respect to the surrounding piston by a pair of O-rings 124 on opposite sides of the previously mentioned radial ports 74, the radial ports being formed both in the valve body and in the surrounding wall of the tubular piston rod 15.

The check valve member 25 is mounted in an integral extension of the valve body 122, the O-ring 26 forming the seat of the check valve being retained by a ring 126 backed against a snap ring 128. This integral extension of the valve body 122 is provided with diametrically opposite notches 130 which may be engaged by a long screw driver for removal of the valve body through the outer end of the piston rod.

To cause the spring 27 to transmit only axial force to the locking valve ball member 24, a suitable guide member 131 partially encloses the ball member and is interposed between the ball member and the end of the spring.

To back up the spring 27, a plug 132 (FIG. 2) is screwed into the interior of the tubular piston rod 15, and this plug is provided with a diametrical slot 134 for removal by a screw driver. The plug 132 is surrounded by an O-ring 135 for sealing engagement with the surrounding wall of the tubular piston rod 15.

As may be seen in FIG. 2, the reservoir spring 30 seats against a washer 138 that presses against the diametrical follower pin 38 of the operating rod 34 so that the follower pin is maintained in the diametrically opposite valleys of the cam means 36 by the force of the reservoir spring 30 in addition to the force of the previously mentioned spring 27 that acts both on the locking valve ball 24 and the check valve member 25. The second end of the reservoir spring 30 presses against the gland 28.

The operating rod 34 is made in two longitudinal sections, one section 34a being connected to the operating arm 82 and having a tubular end portion 34b (FIGS. 2 and 5) that serves as a socket for the other section 34c. The tubular end portion 34b serves as a guide for the reservoir spring 30 and its end 140 (FIG. 3) serves as a stop shoulder to limit the retraction of the gland 28 against the reservoir spring 30.

The modified structure shown in FIG. 7 is in great part identical with structure heretofore described, as indicated by the use of corresponding numerals to designate corresponding parts. The advantage of this modification is that it provides a relatively large fluid reservoir chamber 142, the chamber being relatively large because it is of large diameter, being built around the tubular piston rod 15 instead of being inside the piston rod. The outer wall of the fluid reservoir chamber 142 is formed by a cylinder 144 which is reduced in diameter at one end and is formed with an inner circumferential groove to seat an O-ring 145 in sealing contact with the tubular piston rod 15. The other end of the cylinder 144 is closed by a perforated disk 146 which is apertured to fit around the tubular piston rod 15 and which is held in position by a snap ring 148. One end of the fluid reservoir chamber 142 is formed by a piston generally designated 150 comprising a flanged sleeve 152 and a packing cup 154 of rubber-like material that makes sealing contact both with the tubular piston rod 15 and with the surrounding cylinder 144. A suitable coil spring 155 in compression between the piston 150 and the disk 146 maintains the fluid under pressure in the reservoir chamber 142.

An annular gland 156 having an O-ring 158 slidingly embraces the operating rod 34 in the same manner as the previously described gland 28 and, in the same manner, backs against a spring 30. The gland 156 is held in this position in opposition to the spring 30 by a spacer sleeve 160 that backs against the previously mentioned valve body 122. The spacer sleeve 160 holds the gland 156 sufficiently retracted to uncover a radial bore or port 162 in the wall of the tubular piston rod that provides communication between the fluid reservoir chamber 142 and the annular space 164 inside the tubular piston rod 15 between the gland 156 and the valve body 122. This annular space 164 holds an additional quantity of reserve fluid.

One advantage of the modification shown in FIG. 7 is that the embodiment of the invention shown in FIGS. 1 to 6 may be easily changed to the form shown in FIG. 7. The important advantage, however, is that the modified construction will contain a sufficiently large volume of reserve fluid to last through a long service life.

My description in specific detail of the selected embodiments of the invention will suggest various changes, substitutions and other departures from my disclosure within the spirit and scope of the appended claims.

I claim:
1. In a hydraulic locking device having a cylinder, a piston dividing the cylinder into two locking chambers, a locking valve controlling fluid flow between the two chambers to control the freedom of the piston, a tubular piston rod united with the piston, and means including a spring-loaded gland and a portion of said tubular piston rod forming a reservoir for replenishing fluid flow and for fluid flow to compensate for thermal changes, the improvement comprising: means including a normally closed check valve connecting said reservoir with said chambers to control flow between the reservoir and said chambers, said check valve being responsive to said locking valve to be opened by opening of the locking valve and when normally closed positively preventing flow into the reservoir from the chambers.

2. In a hydraulic locking device, the improvement set forth in claim 1 in which said check valve is non-responsive to slight opening of the locking valve and responsive only to greater opening of the locking valve whereby the frequency of opening of the check valve is less than the frequency of the opening to various extents of the locking valve.

3. In a hydraulic locking device having a cylinder, a piston dividing the cylinder into two locking chambers, a locking valve controlling fluid flow between the two chambers to control the freedom of the piston, a tubular piston rod united with the piston, means including a spring-loaded gland and a portion of said tubular piston rod forming a reservoir for replenishing fluid flow and for fluid flow to compensate for thermal changes, and longitudinal means extending into said tubular piston rod and through said gland to control said locking valve, the improvement comprising: a check valve seat concentric to said tubular piston rod and connected with said piston for movement therewith with said longitudinal means extending through said check valve seat and formed with an enlargement to serve as a check valve member in cooperation with said seat for prevention of fluid flow through the seat into the reservoir when said locking valve is closed.

4. In a hydraulic locking device, the improvement set forth in claim 3 in which said longitudinal means is made in sections and in which the sections are separable adjacent said enlargement whereby the section having the enlargement serves as a check valve and with the remainder of the longitudinal means omitted, the two locking chambers may be filled with pressurized hydraulic fluid through said check valve at an advanced point in the procedure of assembling the device and the check valve keeps the fluid in the two chambers under pressure during the completion of the assembly procedure.

5. In a hydraulic locking device, the improvement set forth in claim 3 in which a flow passage for communication between said chambers and through said locking valve is along the part of said longitudinal means that lies between the check valve and the locking valve; and in which a portion of said part adjacent the check valve fits the surrounding structure with only slight clearance sufficient to permit the two chambers to be filled through the clearance but restricted to keep the dynamic pressure generated in the passage from creating excessive pressure in the reservoir when the check valve is open.

6. In a hydraulic locking device having a cylinder, a piston dividing the cylinder into two locking chambers, a locking valve controlling fluid flow between the two chambers to control the freedom of the piston, spring means normally holding said locking valve closed, a tubular piston rod united with the piston, and means including a spring-loaded gland and a portion of said tubular piston rod forming a reservoir for replenishing fluid flow and for fluid flow to compensate for thermal changes, the improvement comprising: a normally closed check valve to control flow between the reservoir and said chambers, said check valve being responsive to said locking valve for transmission from the locking valve to the check valve of the pressure of said spring means whereby the check valve is normally held closed by said spring means.

7. In a hydraulic locking device, the improvement set forth in claim 6 in which manually operable means is operatively connected directly with said check valve to open both the check valve and the locking valve.

8. In a hydraulic locking device, the improvement set forth in claim 7 in which said normally closed locking valve opens in response to an early stage in the operation of said manually operable means and said check valve opens in response to a later stage in the operation of the manually operable means.

9. In a locking device to control relative movement between two members, comprising a hydraulic cylinder connected to one of the two members, a piston rod extending through both ends of said cylinder and connected to the other of the two members, a piston united with said piston rod and dividing the interior of said cylinder into two locking chambers, and a locking valve controlling fluid flow between the two chambers to control the freedom of said piston, reservoir means to contain a reserve supply of fluid to replenish the fluid in said two locking chambers and to permit fluid flow to and from the locking chambers in response to thermal changes, said reservoir means comprising a reservoir cylinder substantially larger in diameter than said piston rod and surrounding the piston rod, one end of said cylinder engaging the piston rod in a fluid-tight manner; an annular gland inside said reservoir cylinder in sealing contact both with the reservoir cylinder and with the tubular piston rod, said gland, reservoir cylinder and piston rod forming an outer annular fluid reservoir chamber; a second inner fluid reservoir chamber inside the tubular piston rod in communication with said outer chamber; and a coil spring acting in compression against said gland to maintain the fluid under pressure in said two reservoir chambers.

10. In a locking device to control relative movement between two members, comprising a hydraulic cylinder connected to one of the two members, a tubular piston rod extending through both ends of said cylinder and connected to the other of the two members, a piston united with said piston rod and forming therewith a piston assembly, said piston dividing the interior of said cylinder into two locking chambers, and a locking valve controlling fluid flow between the two chambers to control the freedom of said piston, the improvement comprising: a passage for fluid flow between said two locking chambers when said locking valve is open, said passage including a longitudinal portion of the interior of said tubular piston rod and including ports in the piston rod on opposite sides of the piston; and means extending through said portion of the tubular piston rod to operate said locking valve, said means having a longitudinally extensive enlargement of a diameter to define with the surrounding structure of the piston assembly, a restriction to retard fluid flow between the two locking chambers and thereby prevent excessively rapid relative movement between the hydraulic cylinder and the piston rod.

11. The improvement as set forth in claim 10 in which said enlargement is in radial alignment with radial bores in the piston rod on one side of the piston, said radial bores being parts of said passage.

12. In a hydraulic locking device having a cylinder, a piston dividing the cylinder into two locking cylinders, a locking valve controlling fluid flow between the two chambers to control the freedom of the piston, a tubular piston rod united with the piston, and means including a spring-loaded gland and a portion of said tubular piston rod forming a reservoir for replenishing fluid flow and for fluid flow to compensate for thermal changes, the combination therewith of: spring means normally holding said locking valve closed; a check valve seat; and a check valve member cooperative with said seat to control flow between said reservoir and said chambers, said check valve member being operatively connected with said locking valve to be forced into said seat by the force of said spring means, said seat being yieldable whereby the seat yields without opening of the check valve in response to only slight opening of the locking valve and the check valve member unseats in response to greater opening of the locking valve.

(References on following page)

References Cited in the file of this patent

UNITED STATES PATENTS

| | | |
|---|---|---|
| 2,365,247 | Carlton | Dec. 19, 1944 |
| 2,453,855 | Oliver | Nov. 16, 1948 |
| 2,507,601 | Kehle | May 16, 1950 |
| 2,559,047 | Porter et al. | July 3, 1951 |
| 2,637,414 | Patriguin | May 5, 1953 |
| 2,726,737 | Chisholm | Dec. 13, 1955 |
| 2,780,321 | Sturari | Feb. 5, 1957 |
| 2,787,485 | Frisell | Apr. 2, 1957 |
| 2,808,904 | O'Connor et al. | Oct. 8, 1957 |
| 2,892,647 | O'Neill | June 30, 1959 |
| 2,922,497 | Porter | Jan. 26, 1960 |